United States Patent [19]

Huet et al.

[11] Patent Number: 4,637,294

[45] Date of Patent: Jan. 20, 1987

[54] DEVICE FOR CONTROLLING THE SUPPLY OF FLUID UNDER PRESSURE TO A HYDRAUIC CIRCUIT AS A FUNCTION OF THE STATE OF LOCKING OF UNLOCKING OF TWO MECHANICAL MEMBERS

[75] Inventors: Yves Huet, Versailles; Christian Perichon, Boulogne-Billancourt, both of France

[73] Assignee: Framatome & Cie, Courbevoie, France

[21] Appl. No.: 681,467

[22] Filed: Dec. 14, 1984

[30] Foreign Application Priority Data

Dec. 16, 1983 [FR] France ................................ 83 20234

[51] Int. Cl.[4] ........................ F15B 13/00; F01L 15/00; G21C 13/00; F16K 37/00

[52] U.S. Cl. .................................... 91/536; 91/189 R; 376/203; 376/463; 137/613

[58] Field of Search ...................... 91/189 R, 222, 422, 91/534, 536; 60/587; 376/203, 463; 137/613, 614.11; 70/263, 264

[56] References Cited

FOREIGN PATENT DOCUMENTS 1222833 6/1960 France ................................ 137/613

1304261 8/1962 France ................................ 137/613

*Primary Examiner*—Robert E. Garrett

*Assistant Examiner*—George Kapsalas

*Attorney, Agent, or Firm*—Pollock, Vande Sande & Priddy

[57] ABSTRACT

The invention relates to a device for controlling the supply of fluid under pressure to a hydraulic circuit as a function of the state of locking or unlocking of two mechanical members.

The device comprises two interconnected jacks (1,2), the rods (3,4) of which are integrally fixed to mechanical members. The piston (30) of the first jack (1) separates the chamber (35) of the latter into two parts **(35*a*,35*b*). The piston (31) of the second jack (2) divides the chamber (35') of the latter into three parts (35'*a*,35'*b*and 35'*c*). The inlet chambers (35*a* and 35'*a*) are connected to pipes for supplying fluid under pressure (10*a*,10*b*), and the outlet chambers (35*b* and 35'*c*) are connected to a depressurizing pipe (20). According to the position of the pistons (30 and 31), which itself depends on the state of locking or unlocking of the rods (3,4), an interconnecting pipe (23) and a pipe (25) supplying the hydraulic circuit with fluid under pressure communicate with one chamber or another. The supply of the hydraulic circuit by means of the pipe (25) is possible only if both rods (3,4)** are unlocked.

The invention is used, in particular, for supplying the circuit controlling an emergency seal of a primary pump of a pressurized-water nuclear reactor.

4 Claims, 5 Drawing Figures

DEVICE FOR CONTROLLING THE SUPPLY OF FLUID UNDER PRESSURE TO A HYDRAUIC CIRCUIT AS A FUNCTION OF THE STATE OF LOCKING OF UNLOCKING OF TWO MECHANICAL MEMBERS

FIELD OF THE INVENTION

The invention relates to a device for controlling the supply of fluid under pressure to a hydraulic circuit as a function of the state of locking or unlocking of two mechanical members.

PRIOR ART

There are many known devices which incorporate two locking means of a mechanical type, which ensure, for example, that a movable member is retained in an inoperative position, and this movable member can be displaced by means of a fluid under pressure which supplies a hydraulic circuit controlling its displacement. In such devices, it is absolutely essential to avoid supplying the hydraulic driving circuit with fluid under pressure for as long as at least one of the retention means is in the locking position. If not, the untimely supply of the hydraulic driving circuit can result in the fracture of components of the device or in defective positioning of the movable member.

In pressurized-water nuclear reactors, pumps are used to circulate the primary fluid consisting of water under very high pressure and at a high temperature, these pumps incorporating along their drive shafts a series of seals of a dynamic type, which make it possible to isolate the inner high-pressure of part the pump from the outside environment. It is of primary importance that these seals should function perfectly because they serve to confine the primary water of the nuclear reactor which can have relatively high radioactivity.

It has therefore been proposed, so that these pumps, called primary pumps, can be operated, to use an emergency seal which can be put into operation when a seal of the pump becomes defective. This safety seal is retained and locked in an inoperative position, during the normal operation of the pump, by means of pins which are locked mechanically and which are connected to jack rods for actuating them.

The safety seal is itself actuated by a driving fluid under pressure when the two retaining pins are unlocked.

In this case, it is extremely important to avoid any actuation of the safety seal for as long as the two retaining pins are not unlocked. Should one of the pins still be locked because of accidental jamming, the seal actuated by the fluid under pressure would in fact assume a slanted position and would not perform its function. There would also be a risk of fracture of a component of the device, particularly the safety seal itself, if one of the pins or both pins remained in the locked position when the pressure controlling the safety seal was supplied.

There is no known device which makes it possible to subject the control of a hydraulic circuit to the state of locking or unlocking of two mechanical members and which is sufficiently reliable and sufficiently simple to ensure faultless operation, for example in association with a primary pump of a nuclear reactor. The hydraulic control devices of the prior art comprise slide valves, the opening or closing positions of which depend only indirectly on the state of locking or unlocking of the mechanical retaining members

SUMMARY OF THE INVENTION

The object of the invention is, therefore, to propose a device for controlling the supply of fluid under pressure to a hydraulic circuit as a function of the state of locking or unlocking of two mechanical members, which functions extremely reliably and which has a simple structure, making it possible to link the possibility of supplying fluid under pressure directly to the state of locking or unlocking of the mechanical members.

For this purpose, the device comprises:

a first hydraulic jack, the chamber of which contains a piston provided with at least one sealing ring, so as to separate the chamber into two parts, the first of which is connected to a pipe for the inflow of fluid under pressure into the jack and the second of which is connected to a depressurizing pipe, the piston being, on one side, integrally fixed to a rod connected to one of the two mechanical members and, on the other side, returned by a spring, the mechanical member being locked or unlocked respectively because the piston is blocked in position toward the inlet end of the jack or is released, a second hydraulic jack, the chamber of which contains a piston which incorporates two parts spaced in the axial direction of the jack and which is provided with at least two sets of sealing rings, so as to divide the chamber into three parts, the first of which, located at the inlet end of the jack, is connected to a pipe for the inflow of fluid under pressure into the jack, and the third, located at the outlet end of the jack, is connected to a depressurizing pipe, the piston being integrally fixed to a rod connected to the second of the two mechanical members, the locking or unlocking being effected respectively because the piston is blocked toward the inlet end of the jack or is released, an interconnecting pipe joining the center parts of the chambers of the two jacks to one another, and a pipe for supplying fluid under pressure to the hydraulic actuating circuit, in communication with the chamber of the second jack in a zone located towards the outlet of this chamber in relation to the interconnecting pipe, the piston of the first jack having, in its blocked position toward the inlet face of the jack under the effect of the spring, such a position that the interconnecting pipe communicates with the second part of the chamber of the jack, and being capable of being displaced, when released, toward the outlet end of the jack, in such a way that the interconnecting pipe then communicates with the first part of the chamber of the jack, the piston of the second jack having, in its blocked position toward the inlet end of the jack under the effect of the spring, such a position that the interconnecting pipe opens into the second part of the chamber of the jack and the pipe supplying the hydraulic circuit opens into the third part, whilst this piston of the second jack can be displaced, when released, toward the outlet end of the jack, in such a way that the interconnecting pipe and the pipe supplying the hydraulic circuit then communicate with the second part of the chamber of the jack.

BRIEF DESCRIPTION OF THE DRAWINGS

To make it easy to understand the invention, a control device according to the invention, used for controlling the supply of the hydraulic circuit for putting into operation a safety seal of a primary pump of a pressurized-water nuclear reactor, will now be described by way of non-limiting example, with reference to the attached FIGS. in which.

FIGS. *2a, 2b, 2c* and *2d* are sectional views of the hydraulic jacks of the control device and of their connecting pipes, in positions corresponding to various operating states.

DETAILED DESCRIPTION

Figure 1:
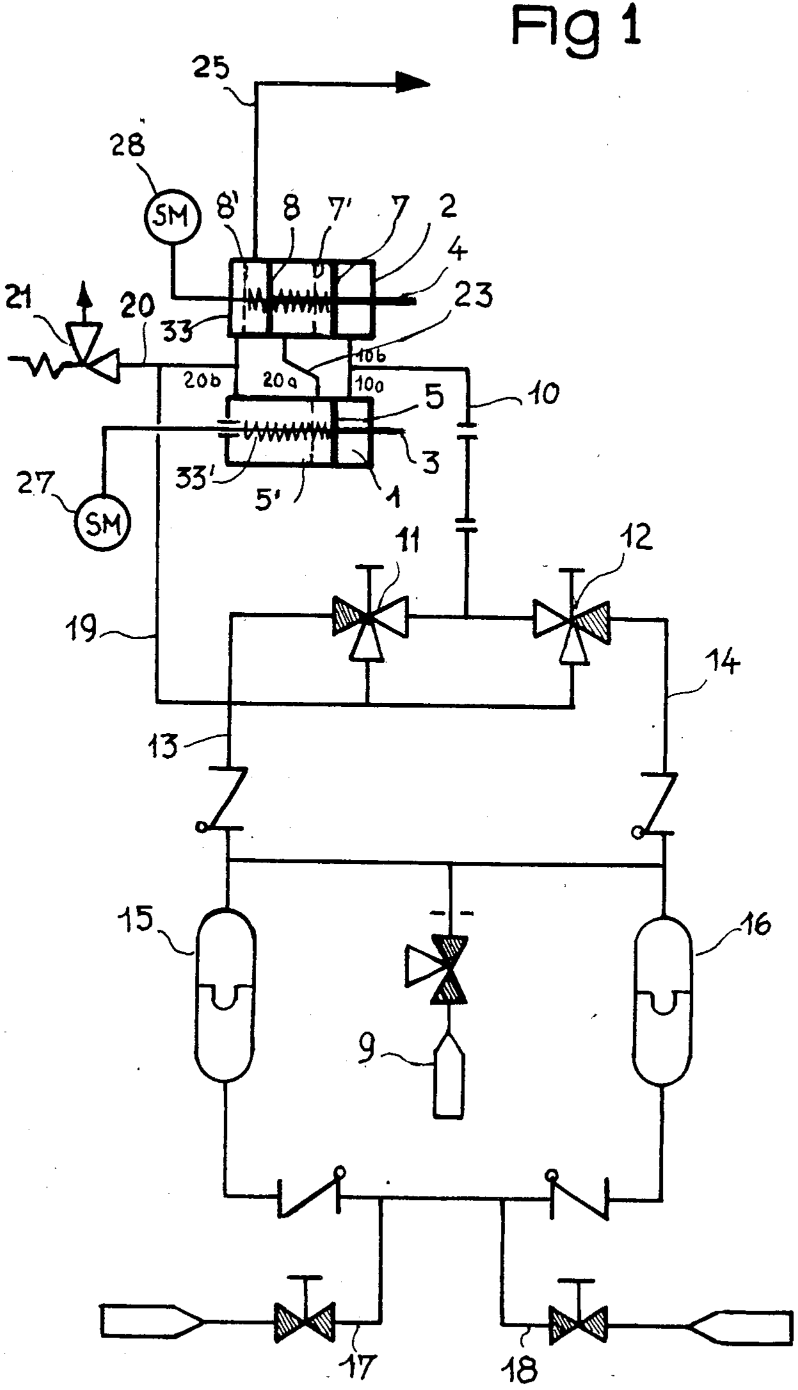
FIG. 1 shows diagrammatically the supply control circuit for putting into operation the safety seal of the pump.

FIG. 1 shows diagrammatically two jacks 1 and 2, the rods 3 and 4 of which are connected to the locking pins of the safety seal of a primary pump of a pressurized-water nuclear reactor.

The rods 3 and 4 are likewise each integrally fixed to a piston which is displaced in a chamber of the jack and which incorporates, as regards the piston of the first jack, one sealing ring 5 and, as regards the piston of the second jack, two sealing rings 7, 8.

The ring 5 divides the chamber of the jack 1 into two parts, and the rings 7 and 8 divide the chamber of the second jack into three parts.

These jacks will be described in more detail with reference to FIG. 2.

When the two pins retaining the leak-proofing seal of the primary pump are locked, as illustrated in FIG. 1, the two jack rods integrally fixed to the pins are themselves locked, so that the pistons are maintained in a position in which their sealing rings occupy the positions shown by unbroken lines in FIG. 1 as a result of the action of the return springs 33 and 33'.

The jacks can be supplied with fluid under pressure via a common pipe 10 which separates into two branches 10*a* and 10*b*. The jacks are supplied in the vicinity of their inlet end in the first part of the chamber limited by the rings 5 and 7 respectively.

When the pins are unlocked, the pistons can be displaced toward the outlet end of the jack, their sealing rings assuming the positions 5' and 7' and 8' respectively.

The pipe 10 can be supplied with pressurized water by means of three-way valves 11 and 12. The valves 11 and 12 are located on pipes 13 and 14 connected to pressurized tanks 15 and 16 respectively. The pressurized tanks contain water admitted via the circuit 9 and put under pressure by nitrogen provided by a supply circuit 17 or by a supply circuit 18 at different pressures.

The valves 11 and 12 also make it possible to control the supply to a line 19 for filling the chambers of the jacks 1 and 2. The pipe 19 is branched off to a pipe 20 on which is located a protective valve 21 set below the pressure of the actuating drive fluid. The pipe 20 itself has two branches 20*a* and 20*b* connected to the jacks in the vicinity of their outlet ends, that is to say to the part of these chambers which is located toward the end opposite the part of the phamber supplied via the pipes 10*a* and 10*b*.

Furthermore, the chambers of the jacks 1 and 2 are connected by means of an interconnecting pipe 23 communicating with the chambers of the jacks 1 and 2 in the vicinity of their center part.

The pipe 25 supplying fluid under pressure to the hydraulic circuit controlling the seal of the primary pump is itself in communication with the chamber of the second jack in a zone located toward the outlet of the jack in relation to the interconnecting pipe 23.

The rods 3 and 4 of the hydraulic jacks 1 and 2 are likewise connected to electrical contactors 27 and 28 which are actuated when the piston and the rod of the jack assume a rear position toward the outlet of the jack under the effect of the fluid under pressure.

FIGS. *2a, 2b, 2c* and *2d* illustrate the jacks in more detail and for different operating states.

According to FIG. *2a,* the pins associated with the rods 3 and 4 of the jacks 1 and 2 respectively are both locked.

According to FIG. *2b,* the pin associated with the rod 3 of the jack 1 is unlocked, the pin associated with the rod 4 of the jack 2 being locked.

According to FIG. *2c,* the pin associated with the rod 3 of the jack 1 is locked, and the pin associated with the rod 4 of the jack 2 is unlocked.

According to FIG. *2d,* the pins associated with the rods 3 and 4 are both unlocked.

With reference to FIGS. *2a* to *2d* as a whole, the more detailed structure of the jacks 1 and 2 and the way in which they are interconnected will now be described.

The corresponding elements of the jacks 1 and 2 bear the same reference numerals, but with the superscript script ' for the elements of the jack 2. Similar elements will therefore only be described with reference to the jack 1.

This jack consists of a cylindrical casing 32 closed by leak-proof bottoms 34 and 36 limiting the chamber 35 of the jack.

The bottoms 34 (or 34' for the jack 2) have passing through them the rods 3 (or 4) integrally fixed to the locking pins of the emergency seal of the primary pump. Leak-proof passage of the rods 3 and 4 is ensured by means of seal 37.

A rod 39 for actuating an electrical contactor passes through the bottom 36 in a leak-proof manner by means of a seal 38.

The chambers 35 (or 35') of the jacks 1 (or 2) contain pistons 30 for the jack 1 and 31 for the jack 2 which are different.

These pistons are integrally fixed at one of their ends to the rod of the jack 3 (or 4) and at their other end to the actuating rod 39. The pistons 30 (or 31) are pushed toward the inlet of the chamber 35 by a spring 33 bearing on the bottom 36 of the chamber of the jack.

The piston 30 of the jack 1 incorporates a set of two sealing rings 40 slightly spaced from one another in the axial direction on the lateral surface of the piston 30, and depending on the position of the piston 30 in the chamber 35 one or other of these rings 40 separates this chamber 35 into two parts 35*a*, or inlet part, and 35*b*, or outlet part. As can be seen by a comparison between, for example, FIGS. *2a* and *2b,* the movement of the piston 30 in the chamber 35 if such that one or other of the rings 40 separates the two parts of the chamber on one side or the other of a clearance 41 located at the level of the interconnecting pipe 23, that is to say towards the center part of the chamber 35. The parts 35*a* and 35*b* of the chamber of the cylinder 1 are therefore separated either by one of the two rings 40 or by the other, depending on the position of the piston 30.

The piston 30 also has a guide part 42 mounted in a slideable and non-leakproof manner within the chamber 35. The inlet part 35*a* of the chamber 35, into which the fluid inflow pipe 10*a* opens, comprises two zones which are separated by the bearing surface 42 and which communicate with one another via channels 43 machined in the piston 30.

The pipe 20, on which the protective valve 21 is located, opens into the part 35*b* of the chamber 35 which is limited by one of the rings 40 performing the function of the ring 5 in FIG. 1.

The piston 31 of the jack 2 comprises two parts, namely 31*a* located towards the inlet of the jack and 31*b* located towards the outlet. The part 31*a* incorporates a sealing ring 49 corresponding to the ring 7 of FIG. 1, which separates the inlet part 35'*a* of the chamber 35' of the jack 2 from the intermediate chamber 35'*b*.

Figure 2A:
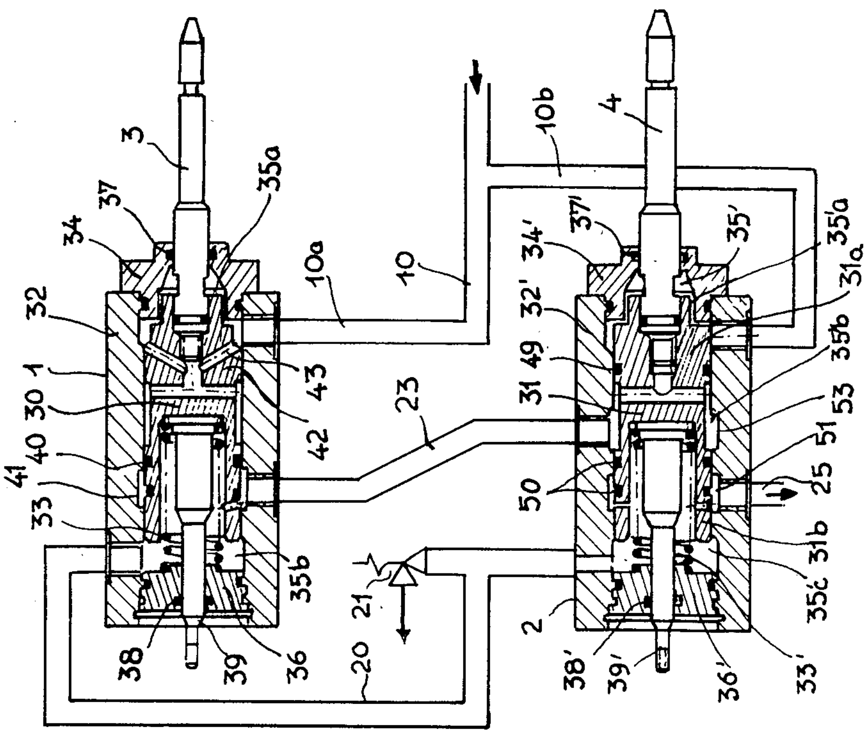
Figure 2B:
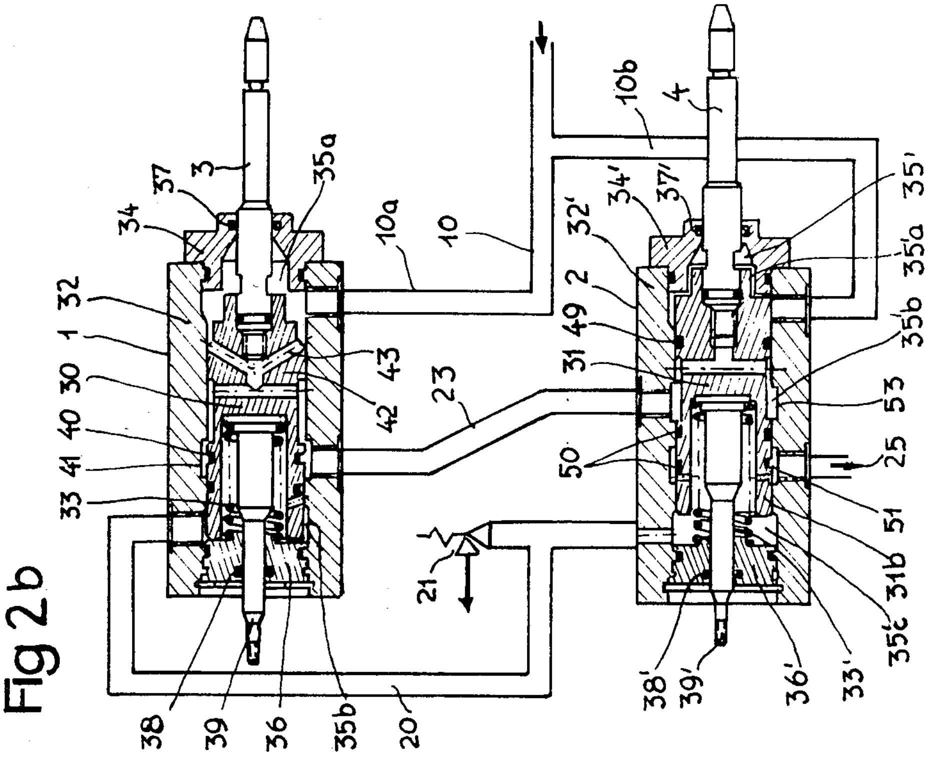
Figure 2C:
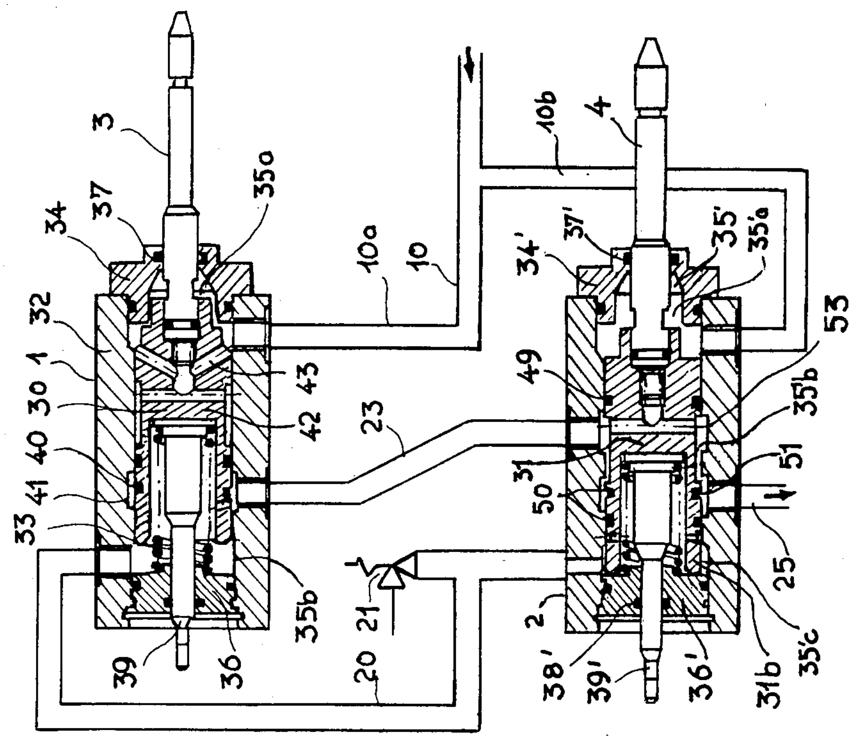

The part 31*b* of the piston 31 incorporates two rings 50, and, as can be seen by a comparison between, for example, FIGS. 2*a* and 2*c*, depending on the position of the piston either one of these rings performs the function of the ring 8 of FIG. 1, separating the intermediate part 35*b* of the chamber 35' from the part 35'*c* located toward the outlet of the jack. During the movement of the piston 31, the rings 50 are displaced on either side of a widened portion 51 of the chamber 35', into which opens the pipe 25 supplying fluid under pressure to the hydraulic circuit actuating the seal of the primary pump.

The discharge pipe 20, on which the valve 21 is located, opens into the part 35'*c* of the chamber located at the outlet end of the latter. The interconnecting pipe 23 opens into a widened portion 53 of the chamber 35' in the intermediate chamber 35'*b*.

The mode of operation of the device illustrated in FIGS. 1 and 2 will now be described, with successive reference to FIGS. 2*a*, 2*b*, 2*c* and 2*d* which correspond to states in which the pins integrally fixed to the rods of the jacks may be unlocked normally or, on the contrary, remain unlocked accidentally as a result of mechanical jamming.

In the case of FIG. 2*a*, the pins integrally fixed to the rods 3 and 4 are locked, so that the pistons 30 and 31 are retained in their end position toward the inlet face of the jacks. If the valves 11 and 12 for supplying fluid under pressure to the inlet chambers of the jacks are closed, none of the chambers of the jacks is under pressure and the system does not supply any fluid under pressure via the pipe 25.

If the valves supplying the jacks by means of the pipes 10 are opened, the rise in pressure is limited to the chambers 35*a* and 35'*a*, the rings 40 and 49 closing the parts 35*a* and 35'*a* of the chambers in a completely leakproof manner. If one of the seals 40 or 49 becomes defective, the fluid penetrates into the chambers 35*b* and 35'*b*, but the pressure cannot rise in these chambers, since the chamber 35*b* communicates with the discharge pipe 20. In all of the cases it is not possible to deliver fluid under pressure via the pipe 25 for supplying the hydraulic circuit.

In the case of FIG. 2*b*, the pin integrally fixed to the rod 3 of the jack 1 is unlocked, and the pin integrally fixed to the rod 4 of the jack 2 is locked, so that the piston 30 assumes its end position toward the outlet face of the jack 1 under the effect of the pressure of the fluid penetrating ihto the chamber 35*a* via the pipe 10*a*. This displacement takes place against the action of the spring 33, and the fluid spreads via the channels 43 into the whole of the chamber 35*a* limited by the second seal 40. The fluid then puts under pressure the pipe 23 and the intermediate chamber 35'*b* of the jack 2, the piston 31 of which remains in the end position toward the inlet face of the jack. In this position, the first seal 50 of the piston 31 closes the intermediate chamber 35'*b*, so that the pipe 25 which then opens into the chamber 35'*c* cannot be supplied with fluid under pressure. In this phase, the chamber 35'*c* is in communication with the depressurizing pipe 20, thus preventing the pipe 25 from being put under pressure.

In the case of FIG. 2*c*, the pin integrally fixed to the rod 3 of the jack 1 is locked, and the pin integrally fixed to the rod 4 of the jack 2 is unlocked.

Under the effect of the fluid under pressure which arrives via the pipe 10*b*, the piston 31 is displaced into its end position toward the outlet of the jack, thus compressing the spring 33'. The piston 30 of the jack 1 is not displaced, and the interconnecting pipe 23 cannot be put under pressure. As a result of this, the pipe 25 for supplying the hydraulic circuit controlling the seal of the primary pump cannot be supplied.

Figure 2D:
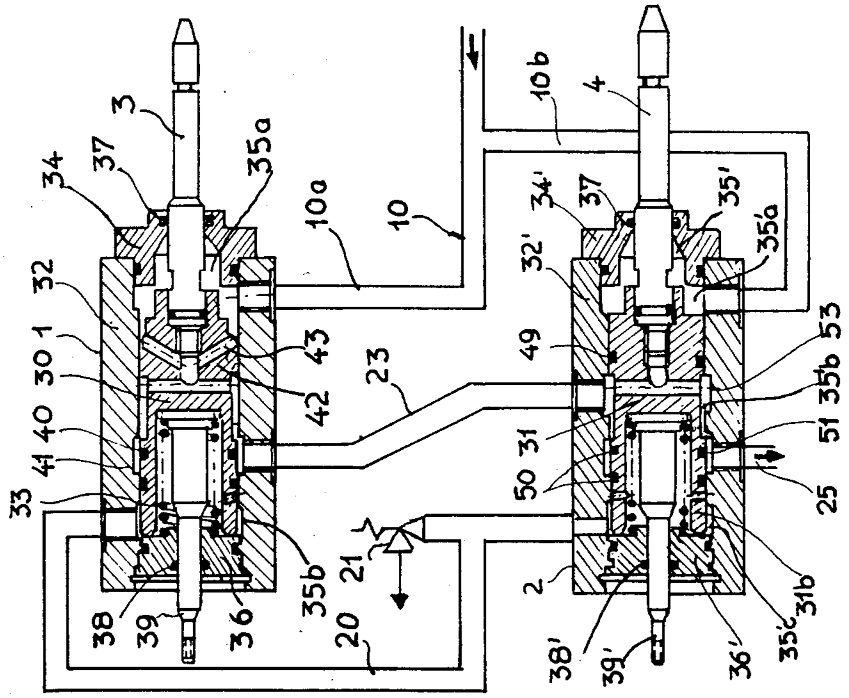

In the case of FIG. 2*d*, both the pin connected to the rod 3 of the jack 1 and the pin connected to the rod 4 of the jack 2 are unlocked, so that the fluid under pressure conveyed via the inflow pipes 10*a* and 10*b* causes the pistons 30 and 31 to be displaced toward the outlet end of the jacks 1 and 2 respectively. The interconnecting pipe 23 then communicates with the inlet part 35*a* of the chamber 35 of the jack 1, so that this interconnecting pipe 23 is supplied with fluid under pressure. The fluid under pressure is conveyed via the interconnecting pipe 23 into the intermediate chamber 35'*b* of the jack 2, into which the pipe 25 supplying the hydraulic circuit also opens. The chambers 35*a* and 35'*b* are isolated from the depressurizing pipe 20 by the seals 40 and 50 respectively, so that the fluid pressure can be established in the supply pipe 25. The fluid under pressure, conveyed to the hydraulic circuit via the supply pipe 25, then causes the seal to be displaced into its operating position.

It thus appears that the emergency seal of the primary pump can be actuated if and only if both pins are unlocked.

It therefore emerges that the main advantages of the device according to the invention are that it is extremely reliable, because the pistons of the jacks which constitute the slides allowing the connection of the various pipes are connected directly to the mechanical members which are locked or unlocked (in the case which has been described, these are the pins for retaining and locking the seal).

On the other hand, the device is relatively simple and merely involves the displacement of the pistons of the two jacks.

It is also possible to achieve additional locking by means of the electrical contacts actuated by the rods 39 and 39' integrally fixed to the jacks 30 and 31.

These electrical contacts can control an active element necessary for operating the hydraulic circuit.

The invention is not limited to the embodiment described; on the contrary, it includes all its alternative forms.

Thus, it is possible to imagine pistons produced in a different way from that described, with a different arrangement of the sealing rings.

It is also possible to devise a circuit supplying fluid under pressure to the control device, which is different from that described.

Nor is the invention limited to the case in which an emergency seal of a primary pump of a nuclear reactor is controlled.

It is possible to use the device according to the invention to prevent the action of a jack for actuating a lifting system comprising two arms locked independently of one another. More generally, the use of the device according to the invention can be imagined in all cases where the supply of hydraulic fluid to an actuating circuit is to be made subject to the state of locking or unlocking of two mechanical members.

What is claimed is:

1. A device for controlling the supply of fluid under pressure to a hydraulic circuit as a function of the state of locking or unlocking of two mechanical members, said device comprising (a) a first hydraulic jack (1) having an inlet end and an outlet end the chamber of which contains a piston (30) provided with at least one sealing ring (40), so as to separate the chamber (35) into two parts (35*a* and 35*b*), the first (35*a*) of which is connected to a pipe (10*a*) situated at the inlet end of the jack for the inflow of fluid under pressure into the jack (1), and the second (35*b*) of which is connected to a depressurizing pipe (20) situated at the outlet end of the jack, the piston (30) being, on one side, integrally fixed to a rod (3) connected to one of said two mechanical members and, on the other side, returned by a first spring, the mechanical member being locked or unlocked respectively because the piston (30) is blocked in position toward the inlet end of the jack (1) or is released;

(b) a second hydraulic jack (2) having an inlet end and an outlet end, the chamber (35') of which contains a piston (31) which incorporates two parts (31*a* and 31*b*) spaced in the axial direction of the jack and which is provided with at least two sets of sealing rings (49, 50), so as to divide the chamber (35') into three parts (35'*a*, 35'*b*, 35'*c*), the first (35'*a*) of which, located at the inlet end of the jack (2), is connected to a pipe (10*b*) for the inflow of fluid under pressure into the jack (2), and the third (35'*c*), located at the outlet end of the jack (2), is connected to a depressurizing pipe (20), the piston (31) being on one side integrally fixed to a rod (4) connected to the second of the two mechanical members and on the other side returned by a second spring, the locking or unlocking being ensured respectively because the piston (31) is blocked toward the inlet end of the jack (2) or is released;

(c) an interconnecting pipe (23) joining center parts of the chambers (35, 35') of the two jacks (1,2) to each other, said center parts being located between the inlet and outlet ends of the respective jacks;

(d) a pipe (25) for supplying fluid under pressure to the hydraulic actuating circuit, in communication with the chamber (35') of the second jack (2) in a zone located between said interconnecting pipe (23) and the outlet end of said second jack;

(e) the piston (30) of the first jack (1) having, in its blocked position toward the inlet face of the jack (1) under the effect of th first spring, a position such that the interconnecting pipe (23) communicates with the second part (35*b*) of the chamber of the jack (1), said piston (30) being capable of being displaced, when released, toward the outlet end of the jack (1), in such a way that the interconnecting pipe (23) then communicates with the first part (35*a*) of the chamber of the jack (1), the piston of the second jack (2) having, in its blocked position toward the inlet end of the jack (2) under the effect of the second spring, a position such that the interconnecting pipe (23) opens into the second part of the chamber (35') of the jack (2) and the pipe (25) supplying the hydraulic circuit opens into the third part (35'*c*), while this piston (31) of the second jack (2) can be displaced when released, toward the outlet end of the jack (2), in such a way that the interconnecting pipe (23) and the pipe (25) supplying the hydraulic circuit then communicate with the second part (35'*b*) of the chamber of the jack (2).

2. A control device as claimed in claim 1, wherein the piston (30) of the first jack (1) an the piston (31) of the second jack (2) are returned toward the inlet end of the corresponding jack by means of said first and said second spring (33, 33'), respectively.

3. A control device as claimed in claim 1 or 2, wherein the pistons (30 and 31) of the jacks (1 and 2) are integrally fixed to respective rods (39, 39') for actuating electricl contacts controlling an active member of the hydraulic circuit.

4. A control device as claimed in claim 1, wherein the hydraulic circuit, the supply of which is controlled, is a hydraulic circuit controlling the displacement of the emergency seal of a primary pump of a pressurized-water nuclear reactor, the two mechanical members consisting of pins for retaining and locking the emergency seal in an inoperative position.

* * * * *